United States Patent
Rudolph

[11] Patent Number: 5,908,159
[45] Date of Patent: Jun. 1, 1999

[54] AIRCRAFT CHUTE EJECTOR NOZZLE

[75] Inventor: Peter K. C. Rudolph, Seattle, Wash.

[73] Assignee: The Boeing Company, Seattle, Wash.

[21] Appl. No.: 08/805,954

[22] Filed: Feb. 24, 1997

[51] Int. Cl.⁶ .................................................. F02K 1/36
[52] U.S. Cl. ...................................... 239/265.17; 60/262
[58] Field of Search .............................. 60/262; 181/215, 181/220; 239/265.13, 265.17

[56] References Cited

U.S. PATENT DOCUMENTS

| | | |
|---|---|---|
| 2,803,944 | 8/1957 | Kroon . |
| 2,838,909 | 6/1958 | Meulien . |
| 2,938,335 | 5/1960 | Cook, Jr. . |
| 2,952,124 | 9/1960 | Pearson . |
| 2,997,845 | 8/1961 | Oulianoff . |
| 3,027,714 | 4/1962 | Parker . |
| 3,237,864 | 3/1966 | Taylor et al. . |
| 3,263,931 | 8/1966 | Bartek et al. . |
| 3,333,772 | 8/1967 | Bruner . |
| 3,346,193 | 10/1967 | Tumicki . |
| 3,352,494 | 11/1967 | Colville et al. . |
| 3,372,876 | 3/1968 | Colville et al. . |
| 3,409,228 | 11/1968 | Mehr . |
| 3,432,100 | 3/1969 | Hardy et al. . |
| 3,463,402 | 8/1969 | Langston, Jr. . |
| 3,524,588 | 8/1970 | Duval . |
| 3,550,721 | 12/1970 | Bruner . |
| 3,613,826 | 10/1971 | Cabassut . |
| 3,637,041 | 1/1972 | Hilbig . |
| 3,647,020 | 3/1972 | MacDonald . |
| 3,664,455 | 5/1972 | Duvvuri . |
| 3,695,387 | 10/1972 | Hilbig . |
| 3,710,890 | 1/1973 | True et al. . |
| 3,774,868 | 11/1973 | Goetz . |
| 3,829,020 | 8/1974 | Stearns . |
| 3,830,431 | 8/1974 | Schwartz . |
| 3,897,169 | 7/1975 | Fowler . |
| 3,910,375 | 10/1975 | Hache et al. . |
| 3,990,530 | 11/1976 | Helfrich et al. . |
| 4,064,692 | 12/1977 | Johnson et al. . |
| 4,074,859 | 2/1978 | Lowman, Jr. . |
| 4,095,417 | 6/1978 | Banthin . |
| 4,165,609 | 8/1979 | Rudolph . |
| 4,175,640 | 11/1979 | Birch et al. . |
| 4,215,536 | 8/1980 | Rudolph . |
| 4,422,524 | 12/1983 | Osborn . |
| 4,537,026 | 8/1985 | Nightingale . |
| 4,690,329 | 9/1987 | Madden . |
| 4,819,876 | 4/1989 | Thayer . |
| 4,909,346 | 3/1990 | Torkelson . |

(List continued on next page.)

OTHER PUBLICATIONS

"The Jet Engine," chapters 6, 14, 15 and 19, Rolls–Royce plc, 1992.

Primary Examiner—Louis J. Casaregola
Attorney, Agent, or Firm—Christensen O'Connor Johnson & Kindness, PLLC

[57] ABSTRACT

An aircraft axisymmetric exhaust nozzle (36) is provided for reducing noise in an intermediate bypass ratio turbofan engine. The nozzle (36) includes a plurality of chute ejectors (38) placed equal distances about the circumference of a nozzle outer structure (46). A translatable centerbody (52) is located within the outer structure (46). The annular space between the outer structure (46) and the centerbody (52) defines a convergent-divergent exhaust duct (56). Each chute ejector (38) includes an inlet ramp (70) rotatably connected to the outer structure (46) along a ramp forward end (78). Each inlet ramp (70) moves between opposed stationary side panels (39) that extend inwardly from the outer structure interior surfaces (50). The side panels (39) are located in longitudinal planes and are triangular in shape. Nozzle aft flaps (114) are used to form the rearmost portions of the nozzle (36). During noise suppression, the inlet ramp (70) is rotated inwardly to allow ambient air (40) to enter the exhaust duct (56) at aspiration ratios of less than 40% of the engine exhaust. When noise suppression is not needed, the inlet ramp (70) is rotated outwardly to a position that is flush and pressure sealed with the outer structure exterior surface (48).

18 Claims, 7 Drawing Sheets

U.S. PATENT DOCUMENTS

| | | |
|---|---|---|
| 4,958,489 | 9/1990 | Simmons . |
| 5,044,553 | 9/1991 | Degress . |
| 5,044,559 | 9/1991 | Russell et al. . |
| 5,154,052 | 10/1992 | Giffin et al. . |
| 5,216,879 | 6/1993 | Zysmaan . |
| 5,261,229 | 11/1993 | Ford et al. . |
| 5,291,672 | 3/1994 | Brown . |
| 5,343,697 | 9/1994 | Johnson et al. . |
| 5,351,480 | 10/1994 | Kretschmer . |

AIRCRAFT CHUTE EJECTOR NOZZLE

FIELD OF THE INVENTION

The present invention relates to aircraft jet engine nozzles, and more particularly, to ejector nozzles for use in reducing engine exhaust noise in intermediate bypass ratio turbofan engines.

BACKGROUND OF THE INVENTION

Jet exhaust noise results from the turbulent mixing of exhaust gases with the atmosphere. The noise is influenced by the shearing action caused by the relative speed and temperature between these airflows. This noise can be reduced by mixing these two airstreams internally and/or by reducing their relative temperature and velocity. Supersonic airplanes require a propulsion system that produces high specific thrust (high exhaust velocities) for acceleration and cruise at supersonic speeds. Therefore, the engines for supersonic airplanes are straight jets or very low bypass ratio engines. To produce sufficient thrust for take-off, these engines have to be operated at or near their maximum power capability, producing high exhaust velocities. Therefore, the exhaust noise is especially high and hard to reduce on supersonic airplanes.

Ejector nozzles are currently used in pure jet and low bypass ratio engines as noise suppression devices. Generally, ambient air is introduced (i.e., aspirated) into a nozzle duct through auxiliary inlets. The ambient air mixes with the high velocity and hot engine exhaust, thereby reducing the overall velocity and temperature of the engine exhaust before it exits the nozzle. Mixing devices are generally used in conjunction with the ejectors in the pure jet and low bypass ratio applications in order to more thoroughly mix ambient air with exhaust gas.

Turbojet and low bypass ratio engines require high aspiration levels (i.e., generally greater than about 60% of the engine exhaust) in order to provide adequate levels of noise suppression. High aspiration levels require the ability to significantly vary nozzle geometry. This requires ejectors capable of assuming a wide range of positions. In addition, the ejectors and mixing components must be capable of being selectively removed from the nozzle duct airflow path in order to transition the nozzle to an acceptable performance configuration for high speed flight, when noise suppression is not required. The combination of these requirements often results in nozzle designs that are heavy, complex, and have poor performance characteristics.

In contrast to the pure jet and low bypass ratio engines, intermediate bypass ratio engines (i.e., generally in the range of 0.6 to 1.2) usually create less jet exhaust noise to begin with due to their ability to produce thrust with lower average exhaust velocities. Noise reduction for intermediate bypass ratio engines generally consists of using a common or integrated exhaust nozzle that partially mixes the bypass and primary exhaust gases prior to their ejection into the atmosphere.

It is known to use ejector nozzles to improve nozzle performance in specific flight conditions. In particular, adding ambient air around the periphery of the exhaust gases of a straight jet or low bypass engine reduces aerodynamic boattail drag at transonic conditions. This is done during transonic and supersonic flight conditions where noise suppression is of no concern. For low bypass ratio applications, ejector nozzles are used to reduce jet noise. But this has generally only been done as a retrofit to older subsonic airplanes to bring them in compliance with new and stricter noise rules. It has been proven repeatedly that an ejector does not provide performance benefits at low speed operation such as take-off and landing. Ejectors may provide a small thrust augmentation statically, if well designed. But at typical take-off speeds the thrust augmentation has been eliminated by external drag and internal losses. At subsonic cruise speeds a deployed or fixed geometry ejector causes significant thrust losses and is absolutely useless, since noise reduction is not needed in cruise.

Up to very recently, it was a common belief that the optimum engine cycle for supersonic airplanes are straight jets or very low bypass ratio engines. In order to meet stage 3 or more stringent future noise rules these engines needed jet noise suppressers with a capability of up to 22 decibel. This called for ejector nozzles with aspiration ratios of 80 to 120%. The huge geometric variation required cannot be met by an axisymmetric exhaust system, but required two-dimensional ejector nozzles of large dimensions, high complexity and high weight. Also, the high exhaust gas temperatures of these engines make the material selection for those exhaust systems very difficult.

Newer engine optimization studies indicate that when engines are treated to the same low jet noise level, the engine cycle for supersonic airplanes optimizes at significantly higher bypass ratios (0.8 or even higher). Since the engines for supersonic airplanes are generally sized by end-of climb thrust requirements, they produce excess thrust at low speeds. They can therefore be operated at less than full power for take-off. Increased bypass ratio and the associated part power take-off both contribute to lowering jet velocities and the requirements for jet noise reduction with the help of an ejector nozzle. The increased bypass ratio also lowers the mixed flow gas temperature and makes the materials choice for the exhaust system simpler.

These discoveries suggest that an optimum noise suppression solution for some supersonic aircraft is to aspirate a relatively small amount of ambient air into the engine exhaust of intermediate bypass ratio turbofan engines during takeoff climb-out and landing conditions. This has resulted in a need for such an ejector nozzle. The ideal nozzle should be light, compact, simple, and reliable. The ideal nozzle should include mixing components to further increase the mixing of ambient air with exhaust gas in a way that does not adversely affect the engine and nozzle performance. Also, the ejector nozzle should be operable and efficient at speeds up to Mach 0.7 or 0.8 to permit jet noise suppression during climb-out. Further, the ideal nozzle should not adversely affect the nozzle performance during nonsuppression flight at high speeds.

The efficient operation of an ejector depends on several parameters. First, the internal high energy (pressure) engine exhaust flow has to be accelerated to a very high velocity, so that its pressure drops and helps suck in low energy (pressure) ambient air. Secondly, to maximize the amount of ambient air sucked in through a given inlet passage, it is also important to increase the length of shear layer between the streams, which calls for a lobed confluence of the flows or alternating channels. Thirdly, in order to get as complete mixing as possible inside the limited length nozzle, to treat and contain the associated mixing noise, the cross-sectional size of the interspersed flows has to be small. The present invention is directed to provide an ejection nozzle that meets the afore listed objectives.

SUMMARY OF THE INVENTION

In accordance with aspects of this invention, an axisymmetric engine exhaust nozzle is provided for reducing exhaust noise in a intermediate bypass ratio turbofan engine. The nozzle includes a plurality of chute ejectors placed equal distances about the circumference of an axisymmetric outer structure. A preferred number of chute ejectors is between 12 to 36. A translatable centerbody is located within the outer structure. The annular space between outer structure interior sidewalls and centerbody exterior surfaces defines a convergent-divergent exhaust duct. Nozzle aft flaps are provided aft of the chute ejectors in order to form the rearmost portions of the nozzle.

In accordance with other aspects of this invention, each chute ejector includes a rectangular inlet ramp rotatably connected along its forward end to the outer structure, the axis of rotation being transverse to the longitudinal centerline of the nozzle. The inlet ramp includes a curved inwardly-facing surface for reducing engine exhaust gas airflow turbulence. The inlet ramp is positioned between opposed stationary side panels that extend inwardly from the outer structure. The side panels are triangular in shape. Each chute ejector is preferably fabricated from heat resistant materials, such as Inconel or stainless steel and may be fabricated as airfoil-shaped honeycomb panels. Airfoil-shaped support struts extend between the stationary side panels of adjacent chute ejectors in the engine exhaust passages.

In accordance with further aspects of this invention, the stationary side panels each include a wedge crest on the side panel's outer surface. The wedge crest of adjacent chute sidewalls provides a throat for engine exhaust gas airflow.

In accordance with still other aspects of this invention, each chute ejector includes opened and closed positions. To reach the open position, the inlet ramp is rotated inwardly to expose an outer structure inlet opening. To reach the closed position, the inlet ramp is rotated outwardly to close the inlet opening. An actuation mechanism is provided in the outer structure to move the inlet ramps between open and closed positions. A preferred actuation mechanism includes a rotary actuator connected to an idler link, the idler link being rotatably connected to the inlet ramp forward end. The actuator is located in the outer structure at a position forward of the inlet ramps.

During noise suppression, the inlet ramp is rotated inwardly an angle of between about 10 to 25 degrees relative to the nozzle centerline, to allow ambient air to enter the exhaust duct at aspiration ratios of about 20% to about 40% of the engine exhaust. When noise suppression is not needed, the inlet ramp is rotated outwardly to prohibit exhaust from leaking out of the nozzle.

In accordance with still further aspects of this invention, the exterior shape of the outer structure is substantially cylindrical and the interior nozzle sidewalls are bulged outwardly near the location of the chute ejectors. The centerbody includes a longitudinally translatable plug having a crown. The translation of the plug allows a change in the throat area in order to account for changes in engine power. The plug can be translated to locations both ahead of and behind the nozzle interior sidewall bulge in a manner unimpeded by the chute ejectors. The nozzle interior sidewalls and plug form a throat near the chute ejectors when the chute ejectors are in their open positions. The duct cross-sectional area at the nozzle interior sidewall bulge is large when the plug is translated to an aft position. This is useful in reducing the velocity of the engine gases and minimize internal losses in the non-aspirated cruise modes.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The present invention is directed to providing an apparatus for suppressing exhaust noise in intermediate bypass ratio turbofan engines (i.e., bypass ratios of roughly 0.6 to 1.2). As used herein the term "aspirated air" refers to ambient air. The term "engine exhaust" generally refers to a combination of primary and bypass air that enters the ejector nozzle partially or fully mixed. The term "nozzle exhaust" refers to the combination of the aspirated/ambient air and engine exhaust. A nozzle formed in accordance with the present invention is described below as applied to an axisymmetric nozzle.

Figure 1:
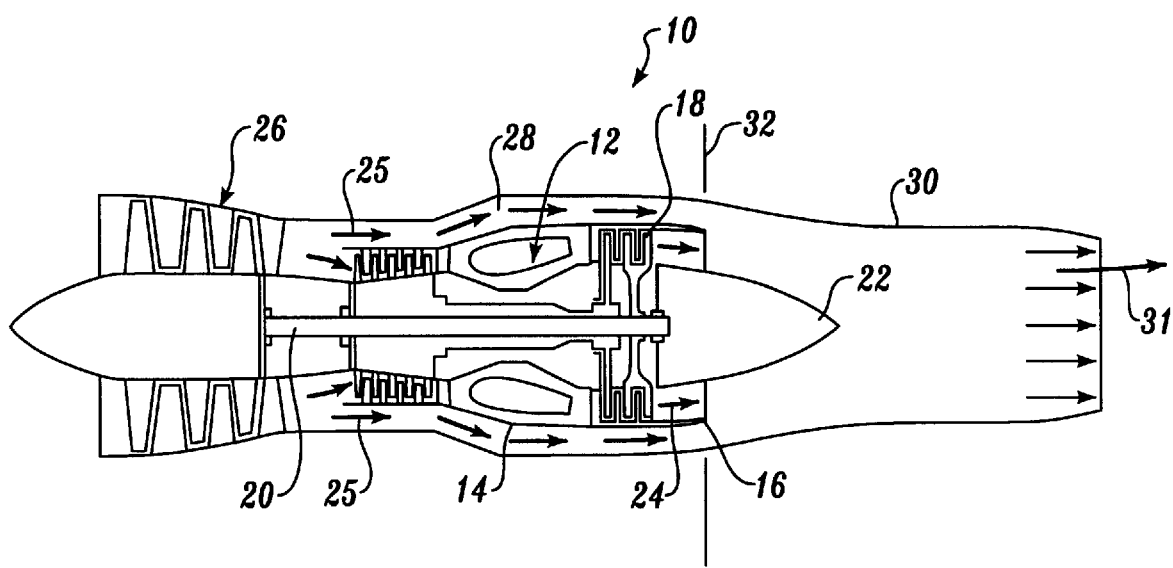
FIG. 1 is a side view of a prior art intermediate bypass ratio turbofan engine for supersonic airplanes.

FIG. 1 is provided for general orientation to turbofan engines. Referring to FIG. 1, intermediate bypass ratio turbofan engine 10 includes a gas generator 12 enclosed in a casing 14 to which an end annulus 16 is attached. A series of turbines 18 are located near the aft end of the generator and are mounted to turbine shafts 20. In some turbofan engine designs, a tail cone 22 extends aftward through the interior of the annulus 16, defining a short primary duct between the annulus 16 and the cone 22. The turbines 18 expel primary exhaust 24 rearward, out the primary duct. A fan 26 supplies a secondary or by-pass airstream 25 that flows through a fan duct 28 circumscribing the gas generator 12. The fan 26 is co-axially mounted to a turbine shaft 20. To reduce exhaust noise for intermediate bypass ratio engines, a common exhaust nozzle 30 extends award from the fan to form a duct region in which the secondary and primary airflows merge prior to being expelled jointly into the atmosphere as exhaust air 31. The subsonic mixing of bypass and primary airflows occurs just aft of the annulus, at a confluence plane 32. A forced mixer (one is shown in FIG. 2 labeled 37) may be mounted at the confluence plane 32 to promote more rapid and complete mixing of bypass and primary airflows prior to their exiting the common nozzle 30.

Figure 2:
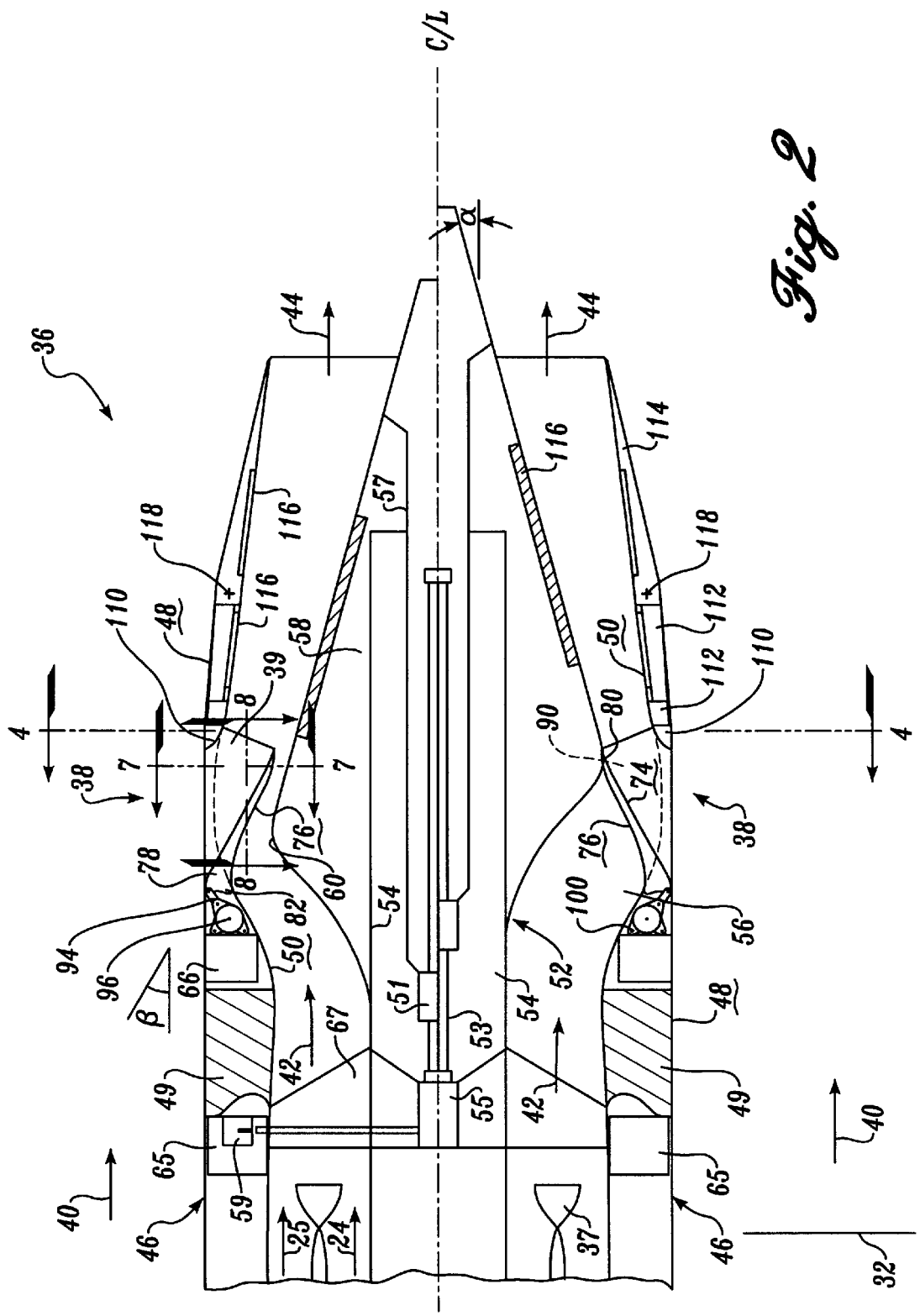
FIG. 2 is a side view of a chute ejector nozzle formed in accordance with the present invention in an intermediate bypass ratio engine, the nozzle being configured for noise suppression.

FIG. 2 is a side view illustration of one embodiment of an axisymmetric noise suppression chute ejector nozzle 36 formed in accordance with the present invention for use with intermediate bypass ratio turbofan engines. In general, the nozzle 36 includes a number of chute ejectors 38 equally spaced about the circumference of the nozzle 36. The chute ejectors 38 are sized to entrain a segmented annulus of ambient air 40 into the nozzle 36 at aspiration ratios of generally less than 40% (depending on flight and engine conditions). The entering ambient air 40 mixes with engine exhaust 42, resulting in a lower combined airflow velocity which in turn reduces jet exhaust noise. During the transonic portion of a flight, the nozzle 36 may utilize the ejectors 38 to maximize flight performance by reducing aft body drag. It is preferred to use a mixer 37 at the confluence plane 32 to promote mixing of bypass and primary airflows.

In more detail, the nozzle 36 includes an outer structure 46 connected to or integral with the bypass airflow duct. If thrust reversers are desired, space may be left available at a forward region 49 in the outer structure within which a thrust reverser system could be accommodated. The outer structure 46 includes numerous support members, e.g., beams, struts, rings, etc., positioned longitudinally and circumferentially at various locations throughout the nozzle. The support members support the weight of the nozzle components and react internal pressure. The present invention uses such support beams and rings to carry the chute ejectors 38 and associated components as well. Outer skins attached to the outboard regions of the support beams and rings form exterior nozzle surfaces 48. Inner skins attached to the inboard regions of the support beams and rings form nozzle interior surfaces or nozzle sidewalls 50.

Figure 5:
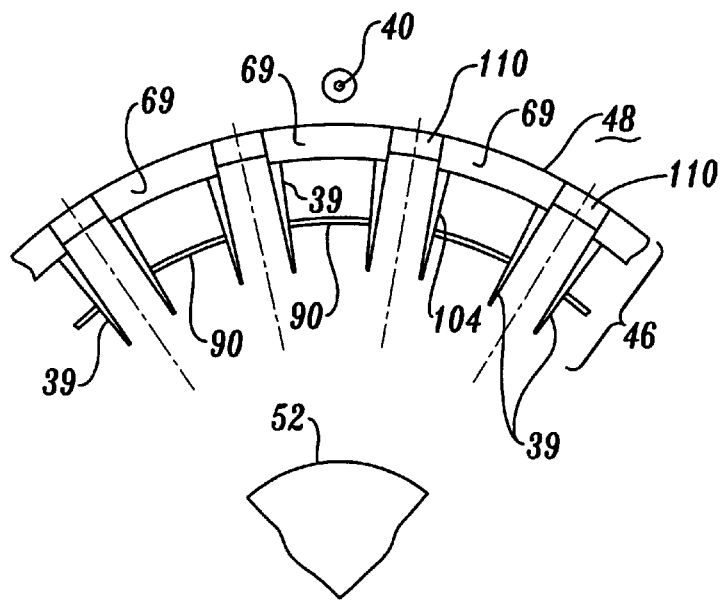
FIG. 5 is a partial cross-sectional view looking forward along line 5—5 of FIG. 3.

These known support members and skins may be modified appropriately for use with the features of the present invention as described herein. In particular, it is preferable to use several circumferential rings throughout the length of the nozzle 36. These rings are held in hoop tension, similar to a large cylindrical pressure vessel. The rings serve to stabilize the nozzle structure at openings in the outer structure. Forward of the thrust reverser, a plug support ring 65 reacts loads from a number of plug support struts 67 that hold a plug support cylinder 54 in place. The plug support ring 65 also reacts thrust reverser loads. A second ring 66 forward of the chute openings reacts thrust reverser aft loads and provides hinge and actuator hard points for the chutes. Aft of the chutes there may be one or more annular tie rings 112. They provide continuity for the aft nozzle outer structure and provide the hard points for hinges and actuators of final nozzle aft flaps 114. Rings 66 and 112 are connected to each other structurally with rectangular beams 69, occupying the outer structure space circumferentially between the chute openings (see FIG. 5).

Figure 3:
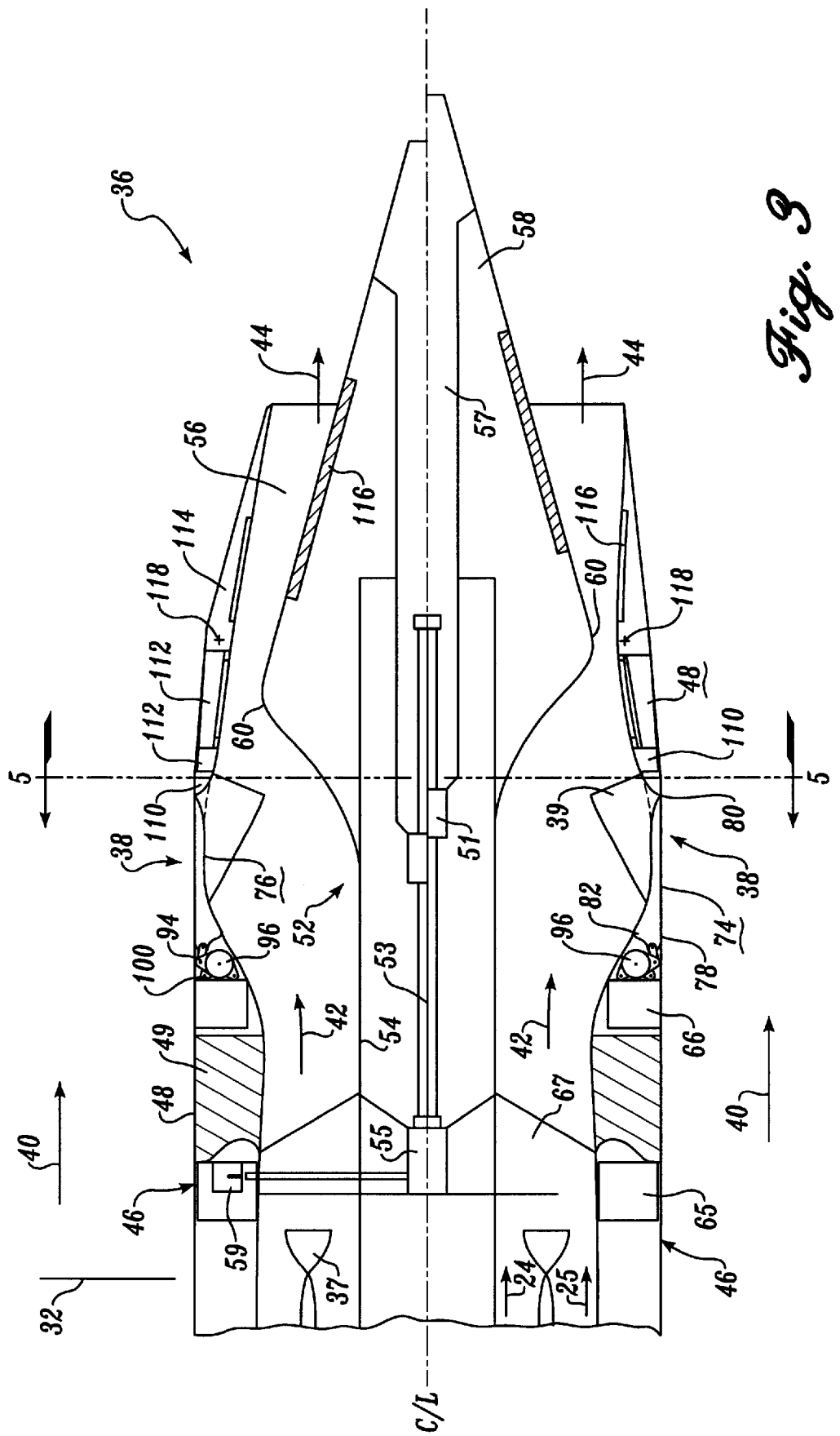
FIG. 3 is a side view of the chute ejector nozzle of FIG. 2, configured for non-noise suppression.

As shown in FIGS. 2 and 3, the centerbody 52 is located within the nozzle 36 along the nozzle longitudinal centerline. The area between the centerbody outer surface and the nozzle sidewalls 50 defines a nozzle exhaust duct 56. The centerbody 52 is shaped such that by translating the centerbody longitudinally, the desired duct area progression and throat areas and locations for the various engine and nozzle operating conditions can be met. Since translating centerbodies are known in the art of nozzle design, they are described here in only general terms.

The centerbody 52 includes a translatable plug 58 that rides on the structural support cylinder 54. The support cylinder is connected at its forward end to the forward ring 65 with the number of plug support struts 67. A preferred number of struts is four or more. The plug 58 is similar to a cylinder, though, having a forward end that is sized to fit the support cylinder 54 and an aft end that defines a cone, preferably having a half cone angle α of 15 degrees or less. The maximum diameter of the plug is near the middle. This location is termed the plug crown 60. Forward of the crown 60, the duct area between the outer structure sidewalls 50 and plug 58 converges. Aft of the crown 60, the duct area diverges. A duct throat exists in the region where the nozzle exhaust duct 56 changes from divergent to convergent. Fore and aft translation of the plug 58 varies the area and precise location of the duct throat, allowing the nozzle 36 to be matched to a specific engine setting. The upper half of FIG. 2 shows a plug position which opens up the duct area for the engine exhaust and is used for low engine power settings in the noise reduction mode. The lower half of FIG. 2 shows a plug position with a smaller throat area for high engine power. These aspects are discussed more fully below.

Actuation of the plug 58 can be accomplished using any one of a number of methods. One way is to move the plug 58 with a nut or collar 51 threaded onto a screw jack 53 mounted within the support cylinder 54 and connected to the plug 58 via an inner tube 57. The forward end of the screw jack 53 is rotatably connected to a gear box 55 located in the forward end of the support cylinder 54. The gear box 55, which includes bevel gearing and a drive shaft, is rotatably connected to a motor or actuator 59 located in the outer structure 46 through one of the support struts 67. As will be recognized by those skilled in the art, there exists a number of alternative mechanisms for translating the centerbody plug of bypass ratio engines. For example, the forward end of the power screw may be directly driven by a motor located inside the forward end of the support cylinder 54.

Figure 6:
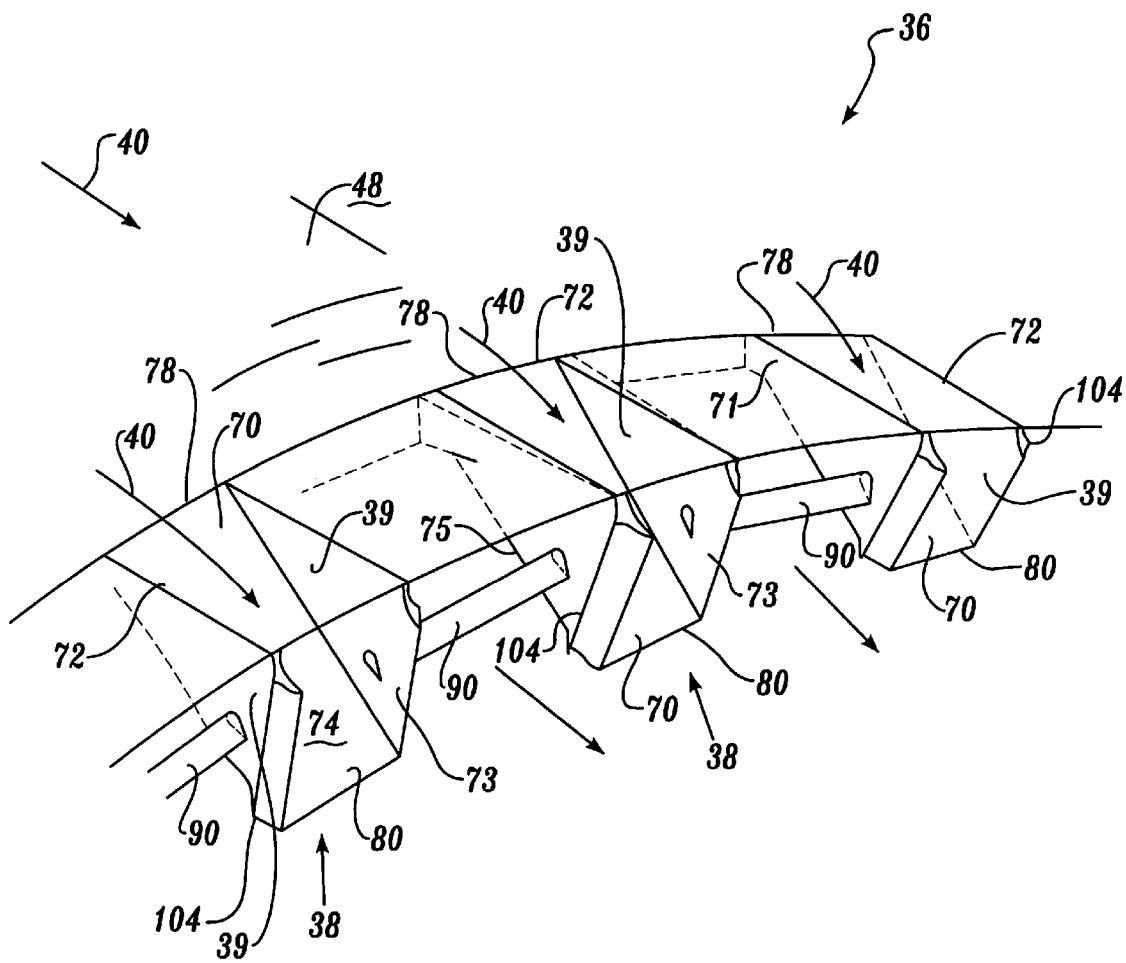
FIG. 6 is a partial perspective view of a plurality of chute ejectors formed in accordance with the present invention.

As shown in FIG. 6 and noted above, the chute ejectors 38 are equally spaced about the nozzle circumference. The chute ejectors 38 are interspersed between the multiple longitudinal support beams 69 (shown in FIG. 5) typically located in the outer structure 46. Each chute ejector 38 includes a rectangular inlet ramp 70 that opens and closes to expose and cover, respectively, a similarly-sized inlet opening 72 formed through the nozzle outer structure 46. As shown in FIGS. 2, 3, and 6, each inlet ramp 70 includes an outer surface 74, an inner surface 76 (indicated in FIGS. 2 and 3), a forward end 78, and an aft end 80.

Figure 7:
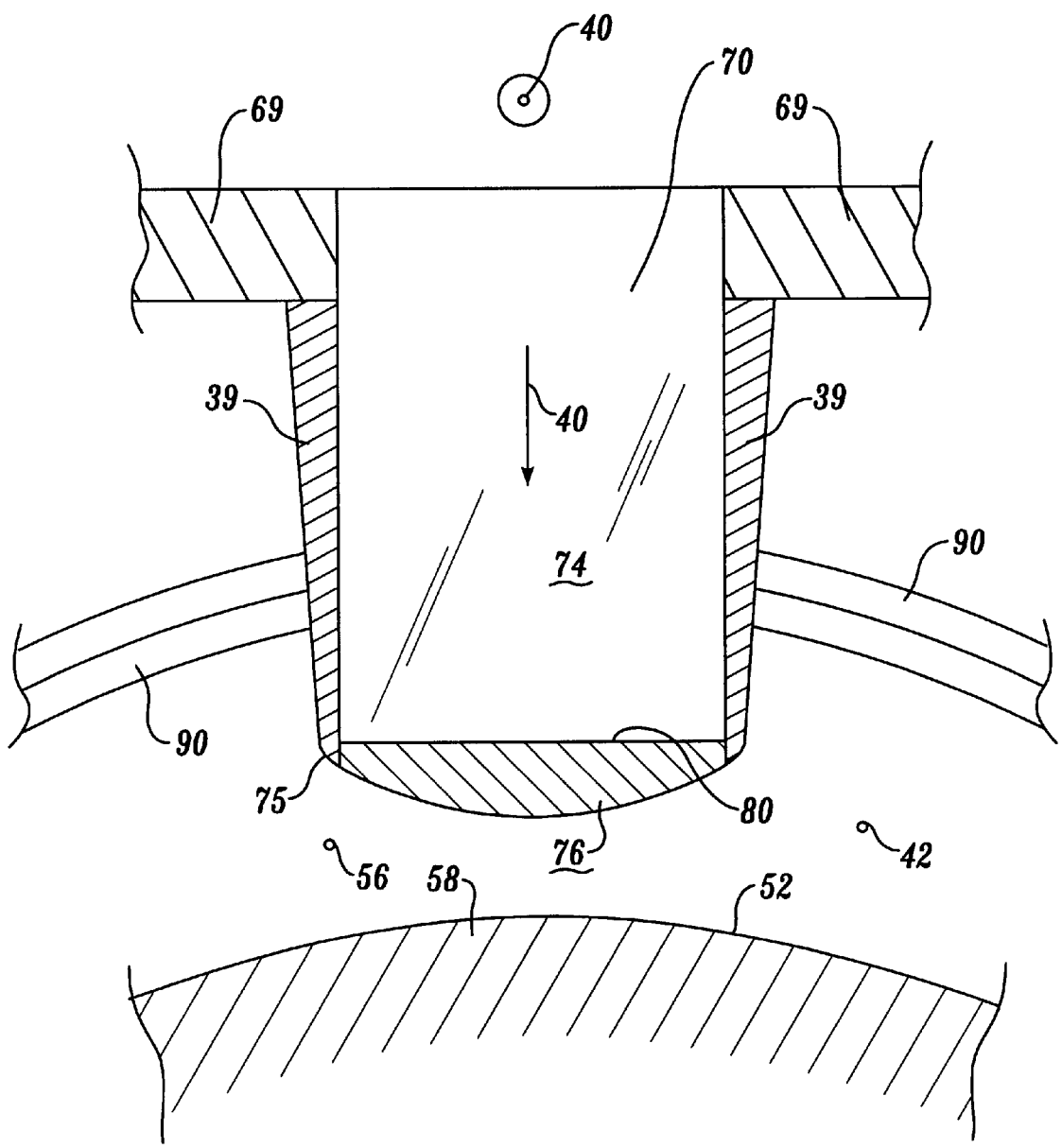
FIG. 7 is a cross-sectional detail view of the upper chute ejector along line 7—7 of FIG. 2.

The inlet ramp forward end 78 is rotatably connected to the nozzle outer structure 46, preferably to the second mount ring 66. The forward end 78 is rounded and stays in smooth and sealed contact with the outer surface of the nacelle during ramp deployment. This is to help the ambient air 40 negotiate the turn into the ejector inlet opening 72. The ramp forward end axis of rotation 82 is transverse to the nozzle centerline. The ramp aft end 80 tapers to an aerodynamic edge. The ramp outer surface conforms to the exterior outer structure surface 48 and is smooth. The inner surface 76 near the ramp forward end bulges inwardly, i.e., toward the engine centerline (see FIG. 7). This shape forms a round leading edge for the chute and helps the engine exhaust flow 42 to negotiate the bifurcation around the chutes. The inlet ramps 70 could be made from various materials in various manners. For example, the ramps could be made from stainless steel, Inconel, as brazed honeycomb structure, or as a box with corrugated stiffeners using the superplastic forming process, or any one of a number of alternative methods.

Referring to FIG. 6, each chute ejector 38 further includes parallel stationary side panels 39 extending radially inward from the nozzle outer structure 46. The panels are positioned along both lateral edges of each inlet ramp 70. The side panels 39 have a generally triangular planform. One panel corner 71 is positioned near the ramp forward end with the opposed panel edge 73 (i.e., the trailing edge) being positioned near the ramp aft end 80. The panel lower edge 75 coincides with the ramp outer surface 74 when the ramp is in its open position. The slope of the side panel trailing edge 73 is approximately normal to its lower edge 75.

Figure 8:
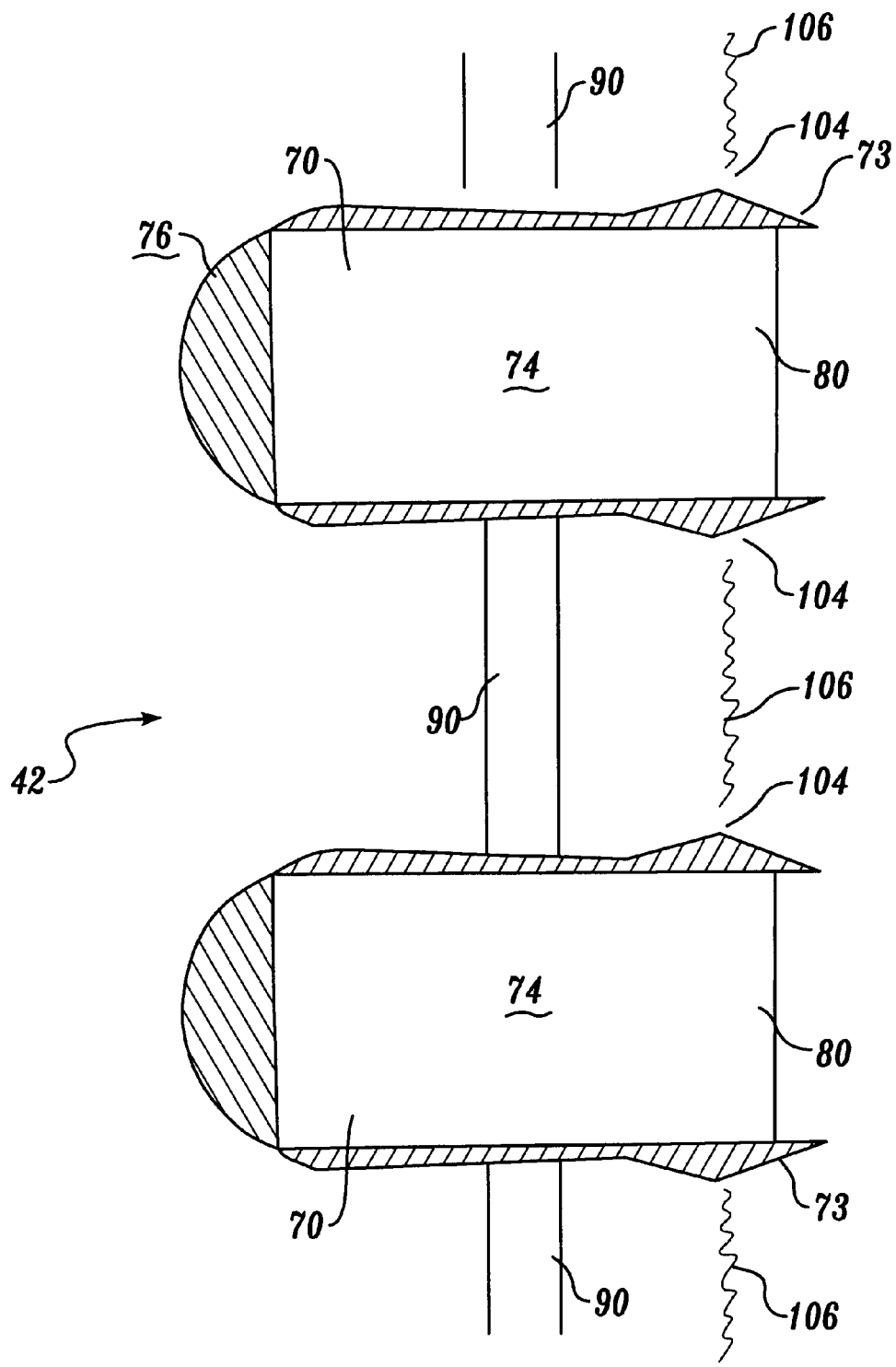
FIG. 8 is a cross-sectional detail view of the upper chute ejector along line 8—8 of FIG. 2.

When the ramps are in the open position shown in FIGS. 2 and 6 and described below, the combination of the ramp 70 and the panels 39 forms a chute-like inlet path that directs incoming ambient air 40 in an aftward longitudinal and radial manner. Airfoil shaped support struts 90 extend between the side panels 39 of adjacent chute ejectors 38, and add rigidity to the side panels 39. The surface of each side panel 39 that is exposed to the engine exhaust 42 is substantially flat and smooth, with the exception of a small wedge crest 104 formed near the forward panel corner 71, as shown in FIG. 8. The crest 104 creates a choke plane 106 and a small divergence in the duct 56 for the engine exhaust air 42. These small convergent/divergent paths allow the engine exhaust air 42 to reach sonic velocity in the choke plane 106 and to accelerate to supersonic velocities in the downstream divergence. The supersonic velocity of the engine exhaust 42 and the low static pressure associated with it helps to draw more ambient air 40 into the ejector and increase the aspiration ratio.

Each chute ejector 38 includes opened and closed positions. In the closed position (shown in both upper and lower portions of FIG. 3), the ramp upper surfaces are flush with the surrounding outer structure exterior surfaces 48. This ramp position covers the inlet openings 72 and reduces the aerodynamic drag caused by the ambient air 40 passing over the outside of the ejectors 38. Preferably, the ramp edges should be equipped with seals (not shown) that seal against the edges of the inlet opening (especially the sides and back) when the ramp is closed. Such seals prevent high pressure engine exhaust 42 from leaking outside the nozzle. These same seals may be used to seal the ramp 70 against the side panels 39 when the chute ejector is open in order to prevent engine exhaust 42 from leaking into the upstream part of the chute. The chute ejectors 38 are opened by rotating the ramps 70 inward to allow ambient air 40 to flow into the nozzle 36 via the inlet opening 72. In the open position (shown in both upper and lower portions of FIG. 2), the inward rotation angle β is preferably between 15 to 25 degrees relative to the nozzle centerline.

Any one of a number of available actuation mechanisms can be used to rotate the ramps 70 between their opened and closed positions. One example is shown in both the upper and lower portions of FIGS. 2 and 3. The example actuation mechanism includes an idler link 94 interconnected between the forward end 78 of each ramp 70 and a rotary actuator 96. The connection to the ramp is offset from the ramp forward end axis of rotation 82. Each rotary actuator 96 is positioned in the outer structure 46 forward of its respective chute ejector 38. The actuator 96 is attached to the mount ring 66 using a mounting bracket 100. A radial arm 102 extends from the actuator 96 and is rotatably connected to the idler link 94. Rotation of the actuator arm 102 causes the idler link 94 to follow, which causes the ramp 70 to pivot about its forward end axis 82.

Regardless of the type of actuation mechanism selected, the actuation of the ramps is preferably synchronized. This is best accomplished by using an interconnecting drive shaft system. The phasing of ramp and plug motions is preferably controlled by an electronic engine control system, which itself may be tied into a flight management computer.

Figure 4:
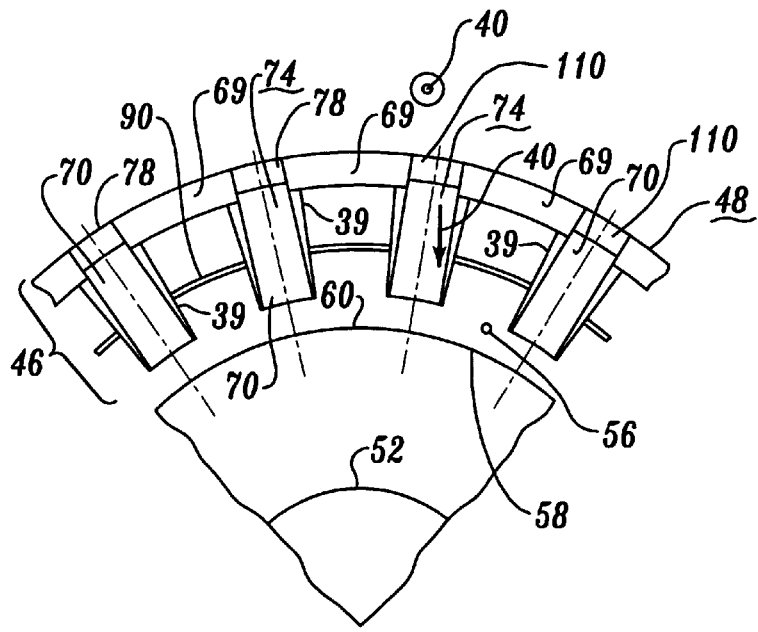
FIG. 4 is a partial cross-sectional view looking forward along line 4—4 of FIG. 2.

Still referring to FIGS. 2 and 3, a short piece of half-rounded inlet lip 110 is provided aft of each chute ejector 38. Aft of the inlet lips 110, the annular tie rings 112 connect the aft ends of the multiple longitudinal support beams 69 (shown in FIG. 4). A series of interleaf segments or final nozzle aft flaps 114 are cantilevered rearwardly from the tie rings 112 at hinges 118. The aft flaps 114 provide the remaining nozzle structure. Actuation of the aft flaps may be accomplished using various known techniques and is not shown. The nozzle aft flaps 114 are used to control the divergence of the aft part of the nozzle in order to match the nozzle geometry to the engine power setting and Mach number requirements. In the low speed acoustic mode with the chute ejector open, the plug 58 is moved fore and aft to control the throat for varying engine power settings. The final nozzle flaps 114 are also moved slightly in or out to change the discharge area and convergence/divergence configuration of the exhaust's final duct path.

Preferably a plurality of acoustic liners 116 are provided along the aft inner nozzle walls, the nozzle aft flap inner surfaces, as well as the plug aft surfaces. The acoustic linings 116 help to reduce internal jet mixing noise, including noise caused by mixing of the bypass and primary engine airflows and/or mixing of the engine exhaust 42 with the entrained ambient air 40.

In the upper half of FIG. 2, the nozzle 36 is shown positioned for noise suppression during a low engine power setting. The ramps 70 are fully open, the centerbody 52 is translated forward, and the aft flaps 114 are opened slightly to provide the necessary duct divergence. In the lower half of FIG. 3, the nozzle 36 is shown positioned for noise suppression during a higher engine power setting. The centerbody 52 is translated slightly rearward and the aft flaps 114 are rotated slightly inward. It is required that the plug crown 60 clears the ramp aft end 80 and the inboard edges of the stationary side panels 39. This assures unimpeded plug longitudinal motion during manipulation of the duct area, without regard to the inlet ramp position. When the chute ejectors are open, the wedge crests 104 work in conjunction with the plug 58 to choke the engine exhaust flow 42.

When noise suppression is not needed, such as during subsonic, transonic and supersonic cruise flight, the chute ejectors are closed and the centerbody 52 is moved aft with the plug crown 60 at, or slightly forward of, the aft flap hinge points 118 (see FIG. 3). Slight movement of the plug forward will increase throat area. The plug and nozzle aft flap positions shown in the lower half of FIG. 3 are representative of a supersonic cruise case. The nozzle configuration in the upper half of FIG. 3 is representative of a subsonic cruise case with the engine throttled back and the throat near the final nozzle exit. However, for transonic acceleration at maximum engine power, the plug crown is positioned at the nozzle aft flap hinge points 118, and the nozzle aft flaps 114 are positioned between the subsonic and supersonic cruise cases.

As can also be seen in FIG. 3, the chute ejector region of the nozzle provides a large annulus for non-acoustic modes with the plug aft. This means that the duct Mach numbers are very low (0.2–0.35), so that the slight discontinuities of the stowed ejector ramps and the chute side panels protruding into the duct will cause very little duct loss in all cruise modes.

As will be readily appreciated from the foregoing description, the present invention nozzle has many advantages. In particular, the nozzle 36 has a much smaller adverse weight and drag impact on the aircraft since the ejector nozzle is short and requires no significant increase in nacelle diameter, which keeps nacelle skin friction and wave drag low. The low aspiration ratio ejector has a more moderate thrust lapse rate with increasing forward speed and could therefore also be used for noise suppression in the far field during climb-out at speeds of up to Mach 0.7 or even 0.8. In the closed position, the chute ejectors have minimal impact on nozzle performance characteristics during subsonic, transonic, and supersonic cruise flight.

While the preferred embodiment of the invention has been illustrated and described, it will be appreciated that various changes can be made therein without departing from the spirit and scope of the invention as defined by the appended claims.

The embodiments of the invention in which an exclusive property or privilege is claimed are defined as follow:

1. A noise suppression exhaust nozzle for an intermediate bypass ratio aircraft engine, the nozzle comprising:
   (a) an axisymmetric outer structure having interior sidewalls and a centerbody located within the sidewalls, the area between the centerbody and the sidewalls defining a convergent-divergent exhaust duct for passage of nozzle exhaust;
   (b) a plurality of chute ejectors positioned circumferentially about the nozzle outer structure, each chute ejector having an open position and a closed position, each chute ejector comprising opposed stationary side panels extending radially inward from the outer structure sidewalls, the stationary side panels including a wedge crest facing adjacent chute ejectors such that the combined wedge crests of adjacent chute ejectors provides a small throat for the engine exhaust; each chute ejector further comprising an inlet ramp positioned between the stationary side panels, the inlet ramp being rotatably connected to the outer structure; and
   (c) an actuation mechanism connected to the plurality of chute ejector inlet ramps and the outer structure, the actuation mechanism for moving the inlet ramps between their open and closed positions, whereby aspirated air is induced into the plurality of chute ejectors when the inlet ramps are in the open position, the aspirated air combining with engine exhaust.

2. A noise suppression exhaust nozzle for an intermediate bypass ratio aircraft engine, the nozzle comprising:
   (a) an axisymmetric outer structure having interior sidewalls and a centerbody located within the sidewalls, the area between the centerbody and the sidewalls defining a convergent-divergent exhaust duct for passage of nozzle exhaust;
   (b) a plurality of chute ejectors positioned circumferentially about the nozzle outer structure, each chute ejector having an open position and a closed position, each chute ejector comprising opposed stationary side panels extending radially inward from the outer structure sidewalls and an inlet ramp positioned between the stationary side panels, the inlet ramp being rotatably connected to the outer structure; and
   (c) an actuation mechanism connected to the plurality of chute ejector inlet ramps and the outer structure, the actuation mechanism for moving the inlet ramps between their open and closed positions, whereby aspirated air is induced into the plurality of chute ejectors when the inlet ramps are in the open position, the aspirated air combining with engine exhaust;
   wherein the plurality of chute ejectors are in spaced-apart position from one another, the nozzle further including airfoil shaped support struts extending between the stationary side panels of adjacent ejector chutes.

3. The aircraft engine noise suppression exhaust nozzle according to claim 2, wherein the stationary side panels include a wedge crest facing adjacent chute ejectors, whereby the combined wedge crests of adjacent chute ejectors provides a throat for the engine exhaust.

4. The aircraft engine noise suppression exhaust nozzle according to claim 1, wherein each inlet ramp is rotatably connected to the outer structure at a forward ramp location, the axis of rotation being oriented generally tangential to the nozzle.

5. The aircraft engine noise suppression exhaust nozzle according to claim 4, wherein the actuation mechanism includes a plurality of actuators located within the outer structure at a position forward of the plurality of chute ejector inlet ramps.

6. The aircraft engine noise suppression exhaust nozzle according to claim 1, wherein each inlet ramp includes a curved inwardly-facing surface for reducing engine exhaust airflow turbulence.

7. The aircraft engine noise suppression exhaust nozzle according to claim 1, wherein when in the open position, each inlet ramp is positioned in a fore-to-aft direction at an angle lying in the range between about 10 and about 25 degrees relative to the nozzle centerline.

8. The aircraft engine noise suppression exhaust nozzle according to claim 1, wherein the aspirated air is ambient air and the engine exhaust includes primary and bypass airflows, the nozzle and the plurality of chute ejectors being sized to provide ambient air entrainment in an amount in the range between about 20% to 40% of the engine exhaust.

9. The aircraft engine noise suppression exhaust nozzle according to claim 1, wherein the plurality of chute ejectors includes 12 to 36 chute ejectors.

10. The aircraft engine noise suppression exhaust nozzle according to claim 1, wherein the nozzle and the plurality of chute ejectors are sized to provide an aspiration ratio of less than about 40%.

11. A noise suppression exhaust nozzle for an intermediate bypass ratio aircraft engine, the nozzle comprising:
    (a) an axisymmetric outer structure having interior sidewalls and a centerbody located within the sidewalls, the area between the centerbody and the sidewalls defining a convergent-divergent exhaust duct for passage of nozzle exhaust;
    (b) a plurality of chute ejectors positioned circumferentially about the nozzle outer structure, each chute ejector having an open position and a closed position, each chute ejector comprising opposed stationary side panels extending radially inward from the outer structure sidewalls and an inlet ramp positioned between the stationary side panels, the inlet ramp being rotatably connected to the outer structure; and
    (c) an actuation mechanism connected to the plurality of chute ejector inlet ramps and the outer structure, the actuation mechanism for moving the inlet ramps between their open and closed positions whereby aspirated air is induced into the plurality of chute ejectors when the inlet ramps are in the open position, the aspirated air combining with engine exhaust;
    wherein the exterior shape of the outer structure is substantially cylindrical; the interior sidewalls are bulged outwardly near the location of the chute ejectors; and the centerbody includes a longitudinally translatable plug having a crown.

12. The aircraft engine noise suppression exhaust nozzle according to claim 11, wherein the plug can be translated to locations both ahead of and behind the nozzle interior sidewall bulge in a manner unimpeded by the chute ejectors.

13. The aircraft engine noise suppression exhaust nozzle according to claim 11, wherein the duct cross-sectional area at the nozzle interior sidewall bulge is large when the plug is translated to an aft position in order to reduce the local engine exhaust velocity in the duct.

14. The aircraft engine noise suppression exhaust nozzle according to claim 11, wherein the nozzle interior sidewalls and plug form a throat near the chute ejectors when the chute ejectors are in their open positions.

15. A chute ejector for use in an aircraft turbofan engine exhaust nozzle having an outer structure, the chute ejector for use in reducing engine noise, the chute ejector comprising:

(a) opposed stationary side panels, wherein the stationary side panels each include a wedge crest formed in the side panel's outer surface;

(b) a rectangular inlet ramp positioned between the side panels, the inlet ramp being rotatable connected to the outer structure at a forward ramp location, the axis of rotation being transverse to the longitudinal centerline of the nozzle; and (c) an actuation mechanism connected to the inlet ramp and secured to the nozzle, the actuation mechanism for rotating the inlet ramp between open position and closed position.

16. The chute ejector according to claim 15, wherein the actuation mechanism comprises a rotary actuator connected to an idler link, the idler link being rotatably connected to the inlet ramp, activation of the rotary actuator causing the idler link to rotate which further causes the inlet ramp to rotate about its transverser axis of rotation, thereby moving the ramp between its open and closed positions.

17. The chute ejector according to claim 15, wherein the inlet ramp includes a curved inwardly-facing surface for reducing engine exhaust airflow turbulence.

18. The chute ejector according to claim 15, wherein when in the open position, each inlet ramp is positioned in a fore to aft direction at an angle lying in the range of between about 10 and about 25 degrees relative to the engine centerline.

* * * * *

UNITED STATES PATENT AND TRADEMARK OFFICE
CERTIFICATE OF CORRECTION

PATENT NO. : 5,908,159
DATED : June 1, 1999
INVENTOR(S) : P.K.C. Rudolph

It is certified that error appears in the above-identified patent and that said Letters Patent is hereby corrected as shown below:

| COLUMN | LINE | |
|---|---|---|
| 11 (Claim 15, | 13 line 9) | "rotatable" should read --rotatably-- |
| 12 (Claim 16, | 8 line 6) | "transverser" should read --transverse-- |

Signed and Sealed this

Seventh Day of December, 1999

Attest:

Q. TODD DICKINSON

*Attesting Officer*     Acting Commissioner of Patents and Trademarks